(12) United States Patent
Hou et al.

(10) Patent No.: US 8,340,605 B2
(45) Date of Patent: Dec. 25, 2012

(54) COORDINATED TRANSMISSIONS BETWEEN CELLS OF A BASE STATION IN A WIRELESS COMMUNICATIONS SYSTEM

(75) Inventors: Jilei Hou, San Diego, CA (US); Amir Farajidana, San Diego, CA (US); Lin Yang, San Diego, CA (US); John E. Smee, San Diego, CA (US); Navid Hassanpour Ghady, New Haven, CT (US); Siddhartha Mallik, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 12/535,824

(22) Filed: Aug. 5, 2009

(65) Prior Publication Data

US 2010/0035600 A1    Feb. 11, 2010

Related U.S. Application Data

(60) Provisional application No. 61/086,539, filed on Aug. 6, 2008.

(51) Int. Cl.
   *H04B 17/00* (2006.01)
   *H04L 25/03* (2006.01)

(52) U.S. Cl. .............. 455/115.1; 455/67.11; 455/101; 455/501; 455/103; 375/296; 375/347; 375/148

(58) Field of Classification Search .............. 455/101, 455/102, 103, 115.1, 132, 500–505, 67.11, 455/68, 69; 375/146, 147, 148, 267, 296, 375/347, 349
   See application file for complete search history.

(56) References Cited

U.S. PATENT DOCUMENTS

| | | | |
|---|---|---|---|
| 7,778,309 B2 | 8/2010 | Jung et al. | |
| 7,995,536 B2 | 8/2011 | Ogawa et al. | |
| 8,064,528 B2* | 11/2011 | Giannakis et al. | 375/260 |
| 2004/0033791 A1* | 2/2004 | Schmidl et al. | 455/137 |
| 2004/0166887 A1* | 8/2004 | Laroia et al. | 455/522 |
| 2004/0176097 A1* | 9/2004 | Wilson et al. | 455/452.2 |
| 2005/0002326 A1* | 1/2005 | Ling et al. | 370/208 |
| 2005/0195763 A1* | 9/2005 | Kadous et al. | 370/328 |
| 2006/0120477 A1 | 6/2006 | Shen et al. | |
| 2007/0099665 A1* | 5/2007 | Kim et al. | 455/561 |

(Continued)

FOREIGN PATENT DOCUMENTS

EP    1802000 A1    6/2007

(Continued)

OTHER PUBLICATIONS

Catt et al: "Sounding reference signals in UpPTS for TDD" 3GPP Draft; R1-081327, 3rd Generation Partnership Project (3GPP), Mobile Competence Centre ; 650, Route Des Lucioles ; F-06921 Sophia-Antipolis Cedex ; France, vol. RAN WG1, No. Shenzhen, China; Mar. 26, 2008, XP050109753 [retrieved on Mar. 26, 2008] the whole document.

(Continued)

*Primary Examiner* — Duc M Nguyen

(57) ABSTRACT

Systems and methods for providing coverage to a first cell through a first antenna system and coverage to a second cell through a second antenna system. Data is also processed for transmission to a mobile device in the first cell using the first and second antenna systems.

40 Claims, 11 Drawing Sheets

U.S. PATENT DOCUMENTS

2007/0274409 A1 11/2007 Park
2010/0220808 A1* 9/2010 Kishigami et al. ............ 375/295

FOREIGN PATENT DOCUMENTS

| EP | 1850508 A2 | 10/2007 |
| --- | --- | --- |
| EP | 1887712 A2 | 2/2008 |
| KR | 1020070039860 A | 4/2007 |
| WO | WO 2007033997 A1 | 3/2007 |

OTHER PUBLICATIONS

Catt et al: "Way forward and Text proposal for DRS confliction Issue" 3GPP Draft; R1-081640, 3rd Generation Partnership Project (3GPP), Mobile Competence Centre ; 650, Route Des Lucioles ; F-06921 Sophia-Antipolis Cedex ; France, vol. RAN WG1, No. Shenzhen, China; Apr. 9, 2008, XP050110038 [retrieved on Apr. 9, 2008] the whole document.

International Search Report and Written Opinion—PCT/US2009/052908—ISA/EPO—Jan. 21, 2010.

Kim Jee Hyun et al: "Efficient Feedback via Subspace-Based Channel Quantization for Distributed Cooperative Antenna Systems with Temporally Correlated Channels" EURASIP Journal on Advances in Signal Processing, Hindawi Publishing Corp, US, vol. 2008, Dec. 1, 2007, pp. 1-13, XP002527506 ISSN: 1687-6172.

LG Electronics: "LGEA s views on the various aspects of downlink reference signal design" 3GPP Draft; R1-062561—DL Reference Signal, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; Oct. 4, 2006, XP050103078 [retrieved on Oct. 4, 2006] p. 1, last paragraph.

Samsung: "RE puncturing pattern for RS boosting" 3GPP Draft; R1-082301-RE-puncturing, 3rd Generation Partnership Project (3GPP), Mobile Competence Centre ; 650, Route Des Lucioles ; F-06921 Sophia-Antipolis Cedex ; France, vol. RAN WG1, No. Warsaw, Pol and; Jun. 24, 2008, XP050110609 [retrieved on Jun. 24, 2008] chapter 2. Cell-specific RE puncturing pattern figure 1.

* cited by examiner

COORDINATED TRANSMISSIONS BETWEEN CELLS OF A BASE STATION IN A WIRELESS COMMUNICATIONS SYSTEM

CROSS-REFERENCE TO RELATED APPLICATION

The present application claims the benefit of U.S. Provisional Patent Application No. 61/086,539 entitled, "DL Common RS Backward Compatible Designs for Distributed MIMO," filed Aug. 6, 2008, which is incorporated herein by reference.

BACKGROUND

1. Field

The following description relates generally to wireless communications, and more particularly to systems and techniques for handling interference in wireless communications.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Sectorization is a classic way of improving system capacity by splitting a single base station into three cells. In early systems, on per cell basis, one directional antenna with a fixed beam pattern was utilized to focus the transmit power within the cell and reduce the interference caused to other cells. Recently, MIMO systems with multiple transmit (TX) antennas have been introduced to generate directional fixed beam patterns to cover the cells. Despite these advances, many mobile devices still experience inter-cell interference at the cell edges.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect of the disclosure, an apparatus for wireless communications comprising includes means for providing coverage for a first cell through a first antenna system, means for providing coverage for a second cell through a second antenna system, and means for processing data for transmission to a mobile device in the first cell using the first and second antenna systems.

In another aspect of the disclosure, a method for wireless communications includes providing coverage for a first cell through a first antenna system, providing coverage for a second cell through a second antenna system, and processing data for transmission to a mobile device in the first cell using the first and second antenna systems.

In yet another aspect of the disclosure, an apparatus for wireless communications includes a processing system configured to provide coverage for a first cell through a first antenna system, provide coverage for a second cell through a second antenna system, and process data for transmission to a mobile device in the first cell using the first and second antenna systems.

In a further aspect of the disclosure, computer program product comprising instructions executable by one or more processors, the instructions comprising code for providing coverage for a first cell through a first antenna system, code for providing coverage for a second cell through a second antenna system, and code for processing data for transmission to a mobile device in the first cell using the first and second antenna systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
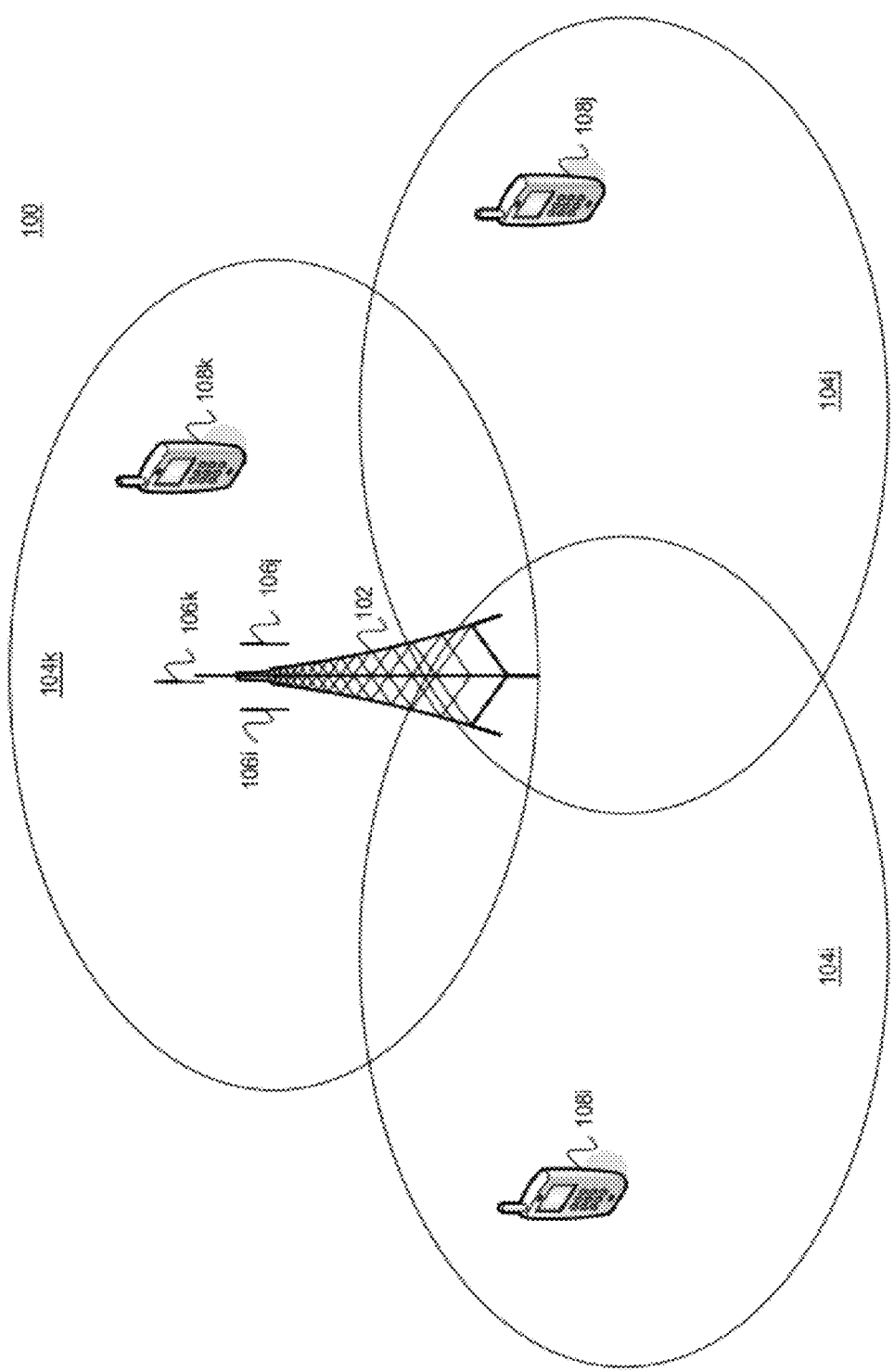
FIG. 1 illustrates aspects of a multiple access wireless communication system.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a smart phone, a cordless telephone, a Session Initiation Protocol (SIP) phone, a laptop, a satellite radio, a global positioning system, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). The techniques described herein can also be utilized in evolution data optimized (EV-DO) standards, such as 1×EV-DO revision B or other revisions, and/or the like. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Various aspects of a multiple access wireless communication system will now be presented with reference to FIG. 1. The wireless communication system 100 is shown with a base station 102. The base station 102 may include several transceivers (not shown) which allow it to serve each cell 104 with a different antenna system 106.

Each antenna system 106 is shown as a single directional antenna, but may be implemented as an arrangement of antenna elements the cooperate to form a directional beam pattern. The base station 102 is shown in communication with three mobile devices 108, one in each cell 104. However, it is to be appreciated that base station 102 may communicate with substantially any number of mobile devices. As depicted, the base station 102 uses the antenna system $106_i$ to communicate with the mobile device $108_i$ in the cell $104_i$, the antenna system $106_j$ to communicate with the mobile device $108_j$ in the cell $104_j$, and the antenna system $106_k$ to communicate with the mobile device $108_k$ in the cell $104_k$.

Alternatively, the antenna system 106 may be a MIMO antenna system. A MIMO antenna system employs multiple ($N_T$) TX antennas and multiple ($N_R$) receive (RX) antennas for data transmission. A MIMO channel formed by the $N_T$ TX and $N_R$ RX antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple TX and RX antennas are utilized. The MIMO system can utilize substantially any type of duplexing technique to divide the uplink and downlink channels such as FDD, FDM, TDD, TDM, CDM, OFDM and the like.

Figure 2:
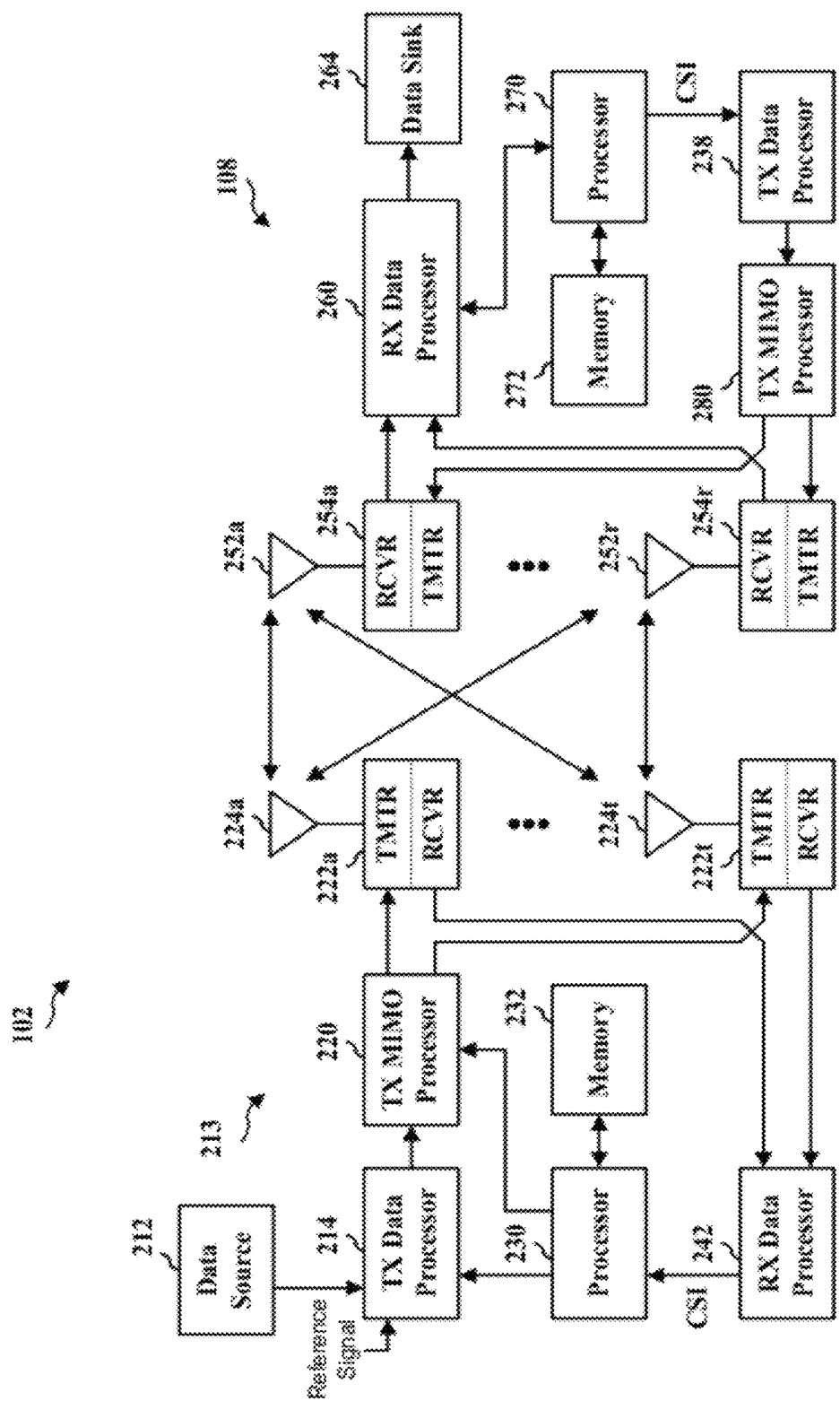
FIG. 2 illustrates aspects of a base station and mobile device in a multiple access wireless communication system.

Various aspects of a base station in communication with a mobile device will now be presented with reference to FIG. 2. At the base station 102, data for a number of data streams is provided from a data source 212 to a processing system 213. The processing system 213 includes transmit (TX) data processor 214, a transmit (TX) MIMO processor 220, a processor 230, memory 232, and a RX data processor 242. Each data stream may be transmitted over a respective antenna system 224. For ease of explanation, a single antenna system 224 for serving one cell is shown. However, as those skilled in the art will readily appreciate, the base station 102 may employ a separate antenna system for each cell. In this example, the antenna system 224 is a MIMO antenna system, which can support multiple data streams by utilizing multiple spatial channels. Alternatively, the antenna system 224 may be comprised of a single directional antenna or multiple antenna elements. A separate transmitter (TMTR)/receiver (RCVR) 222 is provided from each antenna 224 in the system.

The TX data processor 214 formats, codes, and interleaves the data for each data stream based on a particular coding scheme selected for that data stream to provide coded data. The coded data for each data stream can be multiplexed with reference signal using OFDM, or other orthogonalization or non-orthogonalization techniques. The reference signal, which is sometimes referred to as a pilot signal, beacon signal, or the like is typically a known data pattern that is processed in a known manner and can be used at the mobile device 108 to estimate the channel response. The multiplexed reference signal and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream can be determined by a processor 230.

The modulation symbols for all data streams are then provided to a TX MIMO processor 220, which provides spatial processing for the modulation symbols (e.g., for OFDM). The TX MIMO processor 220 then provides $N_T$ modulation symbol streams (or spatial streams) to $N_T$ transmitters (TMTR) 222a through 222t. Each TMTR 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from TMTRs 222a through 222t are then transmitted from $N_T$ antennas 224a through 224t, respectively.

At mobile device 108, the transmitted modulated signals are received by $N_R$ antennas 252a through 252r and the received signal from each antenna 252 is provided to a respective RCVR 254. Each RCVR 254 conditions (e.g., filters, amplifies, and downconverts) a respective received signal, digitizes the conditioned signal to provide samples, and further processes the samples to provide a corresponding "received" symbol stream.

A receive (RX) data processor 260 then receives and processes the $N_R$ received symbol streams from $N_R$ RCVRs 254 based on a particular receiver processing technique to provide $N_T$ "detected" symbol streams. Each detected symbol stream includes symbols that are estimates of the modulation symbols transmitted for the corresponding data stream. The RX data processor 260 then demodulates, deinterleaves, and decodes each detected symbol stream to recover the data for the data stream. The data is then provided to a data sink 264. The processing by the RX data processor 260 is complementary to that performed by TX processor 220 and TX MIMO data processor 214 at base station 102.

The channel response estimate generated by the RX processor 260 can be used to perform space, space/time processing at the receiver, adjust power levels, change modulation rates or schemes, or other actions. The RX processor 260 can further estimate the signal-to-noise-and-interference ratios (SNRS) of the detected symbol streams, and possibly other channel characteristics, and provides these quantities to a processor 270. The RX data processor 260 or the processor 270 can further derive an estimate of the "operating" SNR for the system. The processor 270 then provides channel state information (CSI), which can comprise various types of information regarding the communication link and/or the received data stream. For example, the CSI can comprise only the operating SNR. In other embodiments, the CSI can comprise a channel quality indicator (CQI), which can be a numerical value indicative of one or more channel conditions. The CSI is then processed by a TX data processor 278, spatially processed by the TX MIMO processor 280, conditioned by transmitters 254a through 254r, and transmitted back to base station 102.

At base station 102, the modulated signals from mobile device 108 are received by antenna system 224, conditioned by RCVRs 222, and processed by a RX data processor 242 to recover the CSI reported by the mobile device 108. The reported CSI is then provided to processor 230 and used to (1) determine the data rates and coding and modulation schemes to be used for the data streams and (2) generate various controls for the TX data processor 214 and the TX processor 220. Alternatively, the CSI can be utilized by the processor 270 to determine modulation schemes and/or coding rates for transmission, along with other information. This can then be provided to the base station 102 which uses this information, which can be quantized, to provide later transmissions to the mobile device 108. The processors 230 and 270 direct the operation at the base station 102 and the mobile device 108. Memories 232 and 272 provide storage for program codes and data used by processors 230 and 270, respectively.

While FIG. 2 illustrates a MIMO antenna system, the various concepts described in connection with the MIMO antenna system may be applied to a MISO antenna system where multiple TX antennas, e.g. those on a base station, transmit one or more symbol streams to a single antenna device, e.g. a mobile device. Also, an SISO antenna system can be utilized in the same manner as described with respect to FIG. 2. In the case of a SISO antenna system, the data stream from the TX data processor 214 may be provided directly to the TMTR/RCVR 222 for transmission through the antenna system. As will be described in greater detail later, however, the TX MIMO processor 220 may be used in a SISO antenna system to provide multiple spatial streams from multiple antenna systems to enhance performance of the cell-edge mobile devices.

In describing several aspects of a base station, various functions have been described in terms of a processing system 213. The processing system 213 may be implemented as hardware, software, or combinations of both. Whether implemented as hardware or software will depend upon the particular application and design constraints imposed on the overall system. Skilled artisans may implement the described functionality in varying ways for each particular application.

By way of example, and without limitation, the processing system 213 employed by the base station 102 may be implemented with one or more processors. Examples of processors include microprocessors, a microcontrollers, Digital Signal Processors (DSPs), Field Programmable Gate Arrays (FPGAs), a Programmable Logic Devices (PLDs), controllers, state machines, gated logic, discrete hardware components, or any other processing circuit that can perform the various functionalities described throughout this disclosure.

A processor may be configured to execute software. An example of processor capable of executing software is a microprocessor capable of accessing software on machine-readable media. The microprocessor may be an integrated circuit linked together with machine-readable media and other circuitry through a bus or other communication means. Alternatively, the microprocessor may be part of an embedded system implemented with an Application Specific Integrated Circuit (ASIC). The embedded microprocessor may be an ARM (Advanced RISC Machine) processor with machine-readable media and other circuitry integrated into a single chip.

Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The machine-readable media may be part of the processing system. Alternatively, any portion of the machine-readable media may be external to the processing system. By way of example, the machine-readable media may include a transmission line, a carrier wave modulated by data, and/or a computer product separate from the base station or the mobile station, all which may be accessed by the processor system through the transceiver or by other means.

The software supported by the machine-readable media may reside in a single storage device or distributed across multiple memory devices. By way of example, software may be loaded into RAM from a hard drive. During execution of the software, the processor may load some of the instructions into cache to increase access speed. One or more cache lines may then be loaded into a general register file for execution by the processor. When referring to the functionality of a software, it will be understood that such functionality is implemented by the processor when executing software instructions.

Various concepts will now be presented with reference to a specific transmission data structure. As those skilled in the art will readily appreciate, these concepts may be extended to other transmission data structures. The data structure in this example is based on an OFDM downlink transmission. OFDM is a spread-spectrum technique that distributes data over a large number of subcarriers spaced apart at precise frequencies. The spacing provides "orthogonality" that enables a receiver to recover the data from the subcarriers.

Figure 3:
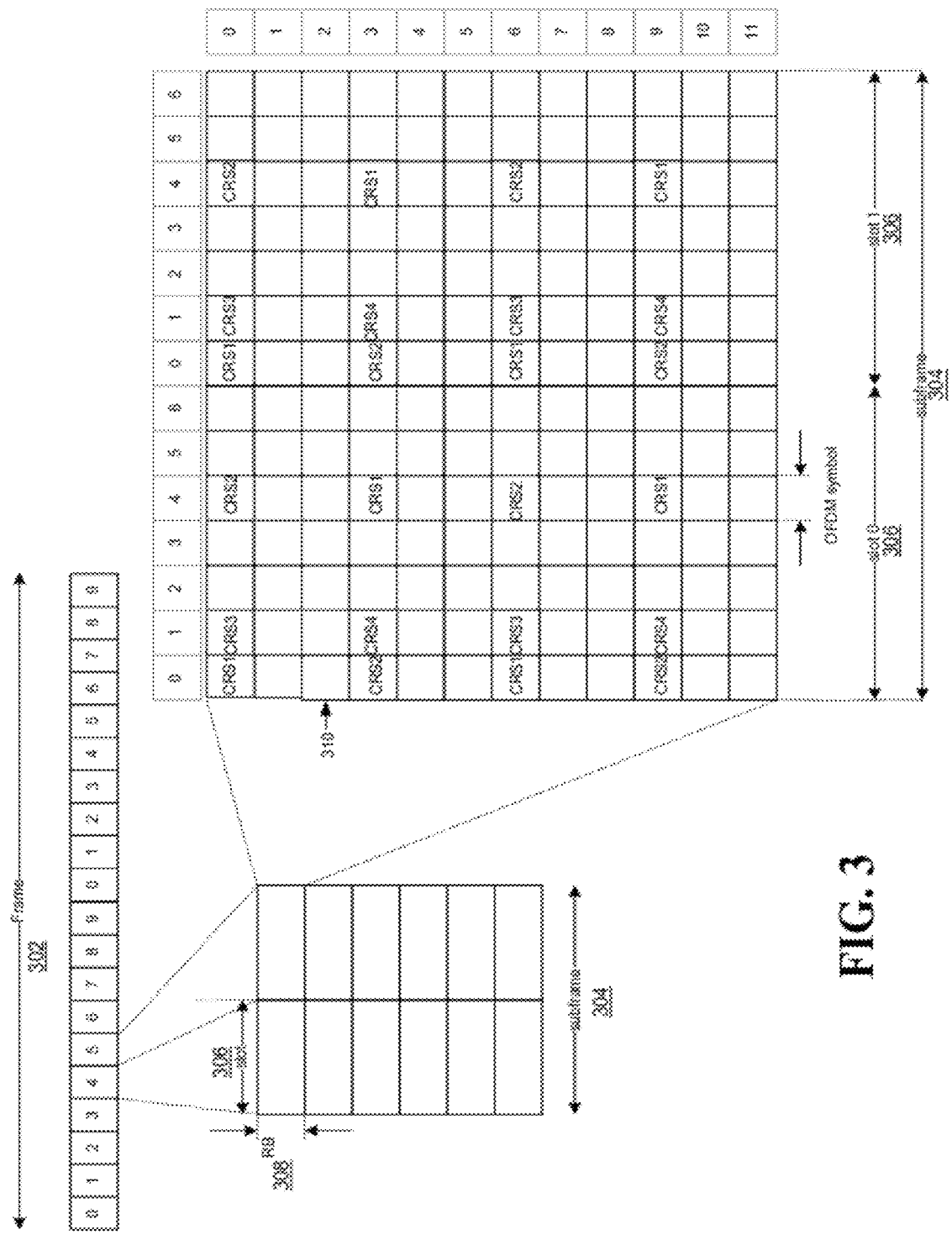
FIG. 3 illustrate aspects of a frame structure for a multiple access wireless communication system.

An example of data structure for the downlink transmission is shown in FIG. 3, with the horizontal dimensions representing time and the vertical dimensions representing frequency. The downlink transmission is divided into units referred as frames 302, but may also be referred to by those skilled in the art as a packet, slot, unit, or any other nomenclature that represents a data structure for transmission over a wireless medium. The frame 302 is further divided into 5 sub-frames 304, with each sub-frame having 2 slots 306. Each slot 306 includes 6 resource blocks (RB)s 308, and each resource block 308 is made up of 84 resource elements 310 comprising 7 OFDM symbols×12 OFDM subcarriers. One resource element carriers QPSK, 16QAM, or 64QAM modulated bits. By way of example, with 16QAM, each resource elements carries 4 bits. The number of resource blocks allocated to each mobile station 108 by the base station 102 is based on the Quality of Service (QoS) requirements of the applications running on the mobile devices 108. The higher the QoS requirement for any given mobile device, the more resource blocks that need to be allocated by the base station to the mobile device.

In one embodiment of the base station 102, a common reference signal (CRS) is transmitted over all three cells served by that base station 102. In this example, the CRSs are transmitted in the first, second, and fifth OFDM symbols in the slot. The base station 102 may use a time shifted frequency domain orthogonal sequence for each reference signal to enable the mobile stations to distinguish them. By way of example, the first $CRS_i$ is transmitted on subcarriers 0 and 6 in the first OFDM symbol and on subcarriers 3 and 9 in the fourth OFDM symbol. The second $CRS_j$ is transmitted on subcarriers 3 and 9 in the first OFDM symbol and on subcarriers 0 and 6 in the fourth OFDM symbol of the same slot. The particular time shifted frequency domain orthogonal sequence for any given cell is based on the cell's identifier (ID) assigned by the network operator (not shown), or some other entity. Data and control information may be transmitted to a mobile station in a cell in the resource elements not occupied by the CRS for that cell. By way of example, the base station 102 may transmit data and control information to a mobile station $104_i$ in a cell $104_i$ on subcarriers 1-5 and 7-11 in the first OFDM symbol and on subcarriers 0-2, 4-8, and 10-11 in the fourth OFDM symbol. The base station 102 may also transmit data and control information to the mobile station $108_i$ on all subcarriers in the second, third, fifth, sixth, and seventh OFDM symbols in the resource block.

Figure 4:
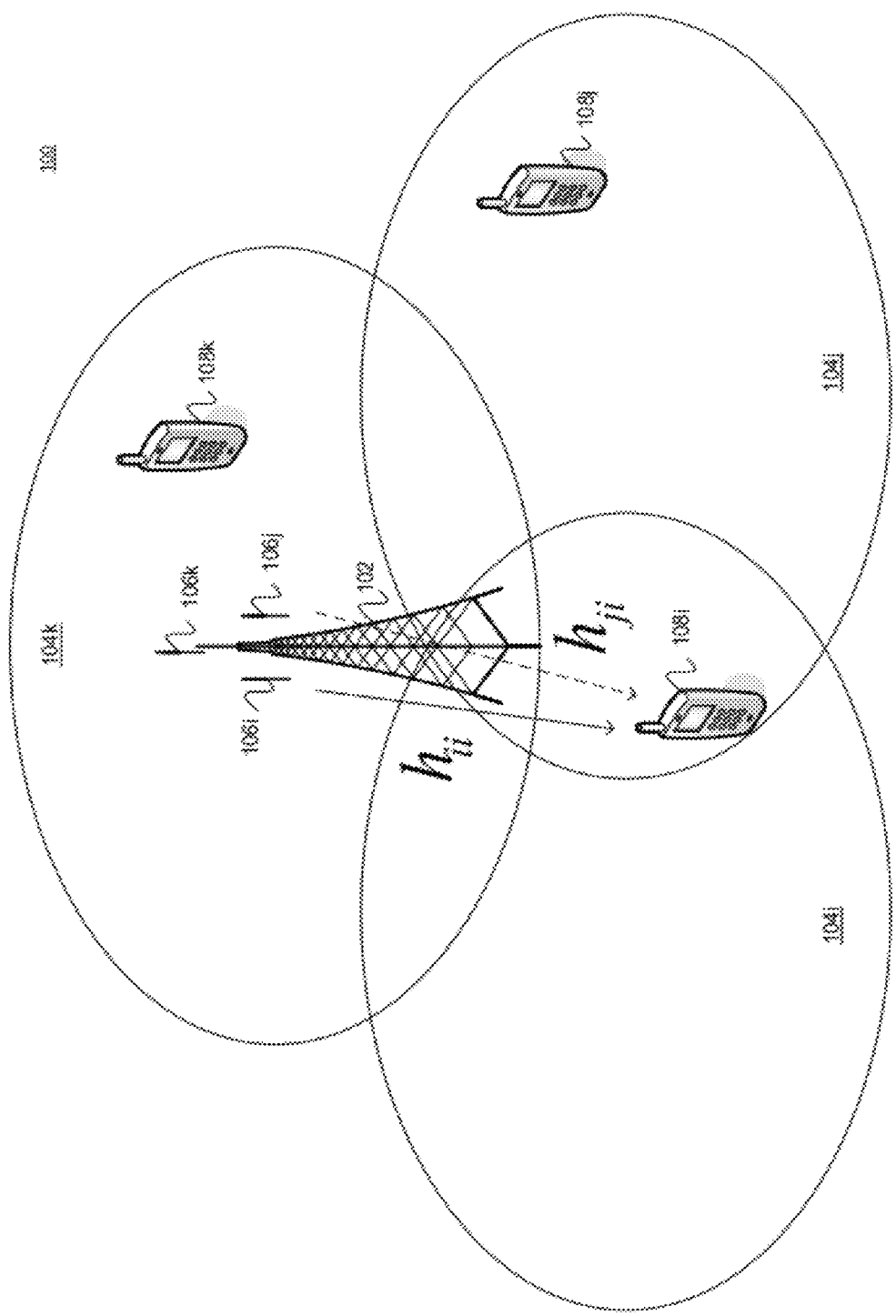
FIG. 4 illustrates aspects of a multiple access wireless communication system with a mobile device at the cell edge.

Turning to FIG. 4, the mobile device $108_i$ has moved to the edge of the cell $104_i$. As a result, the mobile device $108_i$ may begin to experience interference from base station transmissions within the neighboring cell $104_j$. To address this issue, the base station 102 may implement various techniques to coordinate transmissions among the cells 104 to improve the performance experienced by mobile devices at the edges of a cell. More specifically, the base station 102 may coordinate transmissions to mobile devices in different cells and utilize spatial dimensions to (1) enhance the performance of cell-edge mobile devices by either sending more spatial beams or providing more beamforming power gain, and/or (2) minimize interference experienced by cell-edge mobile devices.

Various examples will now be presented with reference to the mobile device $108_i$ operating in a distributed MIMO mode at the edge of the cell $104_i$. In this example, an estimate of the channel $h_{ij}$ from the antenna $106_j$ for the non-serving cell $104_j$ to the mobile device $108_i$ is needed. This channel estimate $h_{ji}$, along with the estimate of the channel $h_{ii}$ from the antenna $106_i$ for the serving cell $104_i$ to the mobile device $108_i$, may be computed by the RX data processor 260 (see FIG. 2) in the mobile device $108_i$ and provided to the base station 102 in the CSI or by other means. The base station 102 may coordinate the transmissions among the cells 104 to periodically allow the mobile station $108_i$ to have a clean (good quality) look at the reference signal transmitted from the antenna $106_j$ for the non-serving, or interfering, cell $104_j$. Various techniques may be implemented at the base station 102 to accomplish this.

In one implementation, the cell IDs for the cells 104 are assigned by a network operator (not shown), or other entity, to ensure that the reference signals transmitted within each cell are staggered over frequency without overlap. This will ensure that the reference signals transmitted by the base station 102 within the three cells 104 do not collide. The base station can then take steps to ensure that the data transmitted by the base station 102 in one cell 106 will not collide with the reference signal transmitted by the base station into a neighboring cell. By way of example, without any action by the base station 102, the data transmitted by the base station 102 to the mobile device $108_i$ in the cell $104_i$ may collide with the reference signal transmitted by the base station 102 in the neighboring cell $104_j$. To avoid this, the base station 102 may puncture the data transmitted to the mobile device $108_i$ over the OFDM sub-carriers occupied by the reference signal transmitted into the neighboring cell $104_j$ by the base station 102. The puncturing operation may be performed in response to feedback from the mobile station $104_i$ indicating that it is experiencing interference from the neighboring cell $104_j$. The feedback may be provided in the CSI or by some other means. The puncturing operation should be done at a low duty cycle (e.g., once every x sub-frames) to avoid adversely impacting the QoS of the mobile device $108_i$. Preferably, only the data, and not the control information, is punctured. The puncturing operation may be performed by the base station's TX data processor 214 in response to control signal information from the processor 230.

Figure 5:
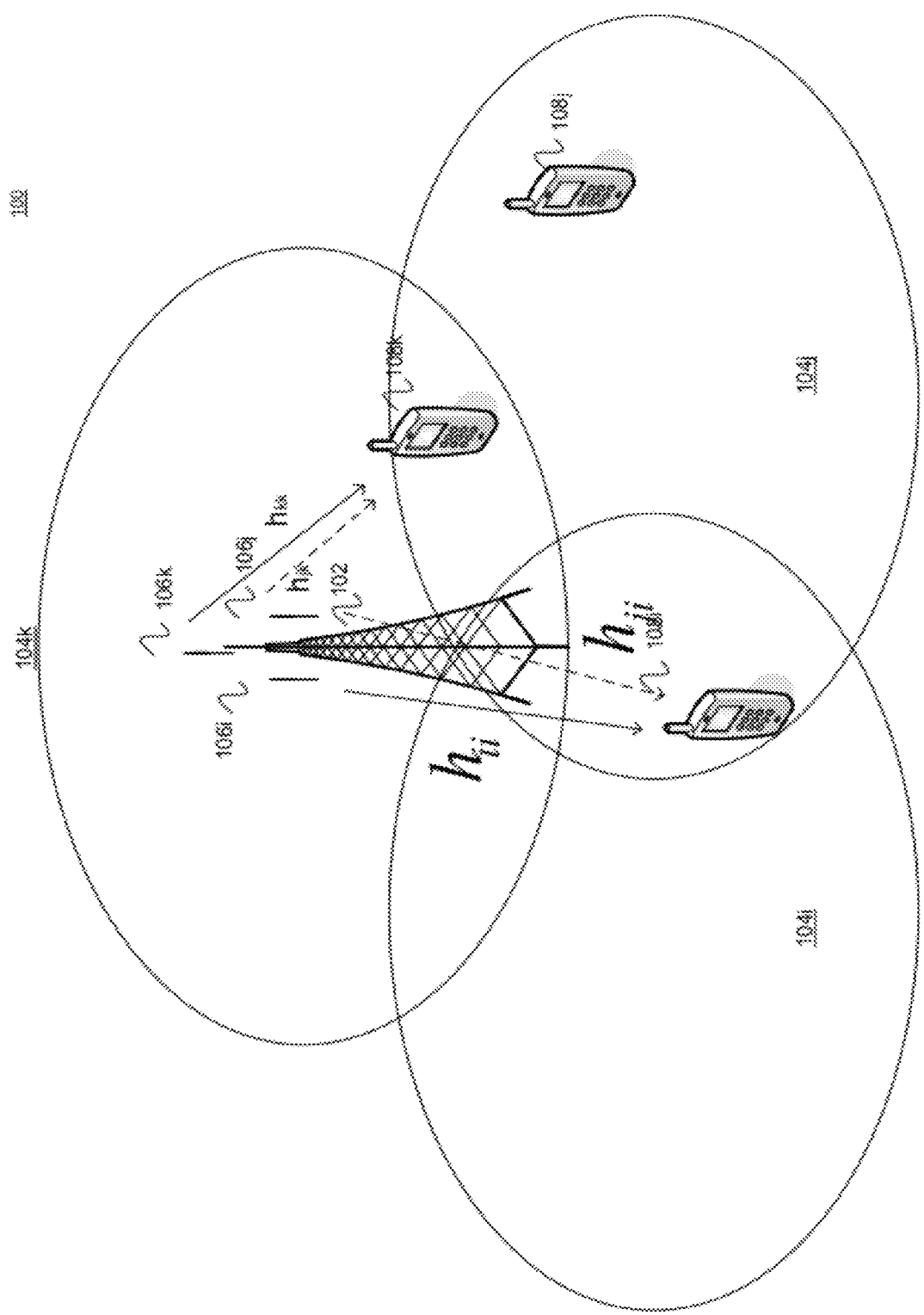
FIG. 5 illustrates aspects of a multiple access wireless communication system with two mobile devices at their respective cell edges.

Turning to FIG. 5, the mobile device $108_k$ has now moved to the edge of the cell $104_k$. As a result, the mobile device $108_k$ may also begin to experience interference from base station transmissions into the neighboring cell $104_j$. As described earlier in connection with the mobile device $108_i$, the mobile device $108_k$ needs to estimate of the channel $h_{jk}$ from the antenna $106_j$ for the non-serving cell $104_j$ to the mobile device $108_k$ and the channel estimate $h_{kk}$ from the antenna $106_k$ for the serving cell $104_k$ to the mobile device $108_k$, and provide this information to the base station 102 through the CSI or by some other means. In this situation, the base station 102 may puncture the data transmitted to both the mobile devices $108_i$ and $108_k$ over the OFDM sub-carriers occupied by the reference signal transmitted into the neighboring cell $104_j$ by the base station 102. Preferably, the base station 102 performs the puncturing operation in a TDM fashion (i.e., over different sub-frames) to avoid visible rate loss over a single resource block.

In an alternative embodiment of the base station 102, the cell IDs for the cells are assigned by a network operator (not shown), or other entity, to ensure that the reference signals transmitted within each cell always collide. This will ensure that the reference signal transmitted by the base station 102 into the three cells 104 do not collide with the data transmitted into neighboring cells 104. Returning to FIG. 4, the base station 102 may puncture the reference signal transmitted to the mobile device $108_i$ over the OFDM sub-carriers occupied by the reference signal transmitted into the neighboring cell $104_j$ by the base station 102. The puncturing operation may be performed in response to feedback from the mobile station $104_i$ indicating that it is experiencing interference from the neighboring cell $104_j$. The feedback may be provided in the CSI or by some other means. The puncturing operation should be done at a low duty cycle (e.g., once every x sub-frames) to avoid adversely impacting the QoS of the mobile device $108_i$. Preferably, only the data, and not the control information, is punctured. The puncturing operation may be performed by the base station's TX data processor 214 in response to control signal information from the processor 230.

Returning to FIG. 5, the base station 102 may puncture the reference signal transmitted to both the mobile devices $108_i$ and $108_k$ over the OFDM sub-carriers occupied by the reference signal transmitted into the neighboring cell $104_j$ by the base station 102. Preferably, the base station 102 performs the puncturing operation in a TDM fashion (i.e., over different sub-frames) to avoid visible rate loss over a single resource block.

The reference signal puncturing approach differs from the data puncturing approach in that reference signal puncturing does not incur rate loss on data channels. When the reference signals are punctured, however, the demodulation performance of the reference signal may be affected. The affect may be minimized with temporal filtering and a low duty cycle puncturing operation.

As described earlier, each antenna 106 shown in FIG. 2 represents a directional antenna. In the case where there are two TX antennas per cell, the base station 102 may perform the puncture operation on a per TX antenna basis. Preferably, the base station 102 performs the puncturing operation associated with each antenna in a TDM fashion (i.e., over different sub-frames) to avoid visible rate loss over a single resource block.

In the case where there are four TX antennas per cell, the base station 102 may also perform the puncture operation on a per TX antenna basis. The base station 102 performs the puncturing operation for a pair of antennas within one sub-frame. By way of example, the base station antenna $106_j$ may comprise four antennas $106_{j1}$, $106_{j2}$, $106_{j3}$, and $106_{j4}$. The base station 102 may perform the puncturing operation for both antennas $106_{j1}$ and $106_{j3}$ during a same sub-frame and perform the puncturing operation for both antennas $106_{j2}$ and $106_{j4}$ during a same sub-frame. Preferably, the base station 102 performs the puncturing operation associated with each antenna pair in a TDM fashion (i.e., over different sub-frames) to avoid large rate loss over a single resource block.

Operation wise, this puncturing procedure is controlled by base station 102, and therefore, it is transparent to the mobile devices 108. As a result, legacy mobile devices that do not recognize the puncturing operation may remain deployed in the wireless communication system, thereby extending their useful lifetime. New mobile devices that are designed to take advantage of the various features presented throughout this disclosure can be made aware of these puncturing operations so they can improve the data performance. By way of example, in a mobile device 108 employing turbo decoding in the RX data processor 260 (see FIG. 2), the LLRs on the sub-carriers being punctured may be zeroed out. The puncture operation can be slowly dynamical over time and be activated/de-activated on need basis from cell to cell.

Several variations to this approach will be readily understood to those skilled in the art from the teachings herein. By way of example, instead of puncturing the data or reference signals completely, the base station 102 can simply transmit the data or reference signals at a much lower power level in the appropriate resource elements.

Regardless of the technique used by a cell-edge mobile device to estimate the channel from a neighboring cell 104, the base station 102 may use this information to enhance the performance of the cell-edge mobile device by either sending more spatial beams or providing more beamforming power gain. Various techniques will now presented for accomplishing this, first for a base station 102 having a single TX antenna per cell, and then for a base station 102 having multiple TX antennas per cell.

Returning to FIG. 4, the mobile device $108_i$ is shown at the edge of the cell $104_i$. In this case, the mobile device $108_i$ either experiences interference from the cell $104_j$ proportional to $|h_{ji}|^2$ or no interference from the cell $104_j$ (no mobile device is scheduled on the same time-frequency resource blocks in the cell $104_j$ as the mobile device $108_i$). In this case, the transmission from the base station 102 to the mobile device $108_i$ is limited to a single stream.

However, when there is no interference from the cell $104_j$, the base station 102 can utilize the link $h_{ji}$ to assist the transmission to mobile device $108_i$. To accomplish this, the base station 102 treats the scalar channels from the antennas 106 of each cell 104 as the components of a virtual vector channel. Therefore, for the mobile device $108_i$, $h_i=[h_{ii} h_{ji}]$. Conceptually, the base station 102 has converted two cells where each cell has single TX antenna 106 to a virtual cell with two TX antennas. In effect, the base station 102 translates the transmission scheme to the mobile device $108_i$ into a single-user MISO scheme where the transmission by the base station to the mobile device $108_i$ can be sent from both TX antennas $106_i$ and $106_j$.

Note that for this scheme, since the mobile device $108_i$ has only one RX antenna, it only gets served one stream. One possible scheme is to enhance transmission performance is beamforming by matching to channel $h_i$ at the base station 102.

In the case where the mobile device $108_i$ has multiple RX antennas, the base station 102 can utilize the additional dimensions to transmit more streams to the mobile device $108_i$. Again, this case is when no mobile devices in the cell $104_j$ are scheduled to receive a transmission from the base station 102 on the same time-frequency resource blocks as the mobile device $108_i$. In effect, the base station translates the transmission scheme to the mobile device $108_i$ into a single-user MIMO scheme where the transmission by the base station to the mobile device $108_i$ can be sent from both Tx antennas $106_i$ and $106_j$.

A loose-coordinated scheme may be implemented where the mobile device $108_i$ feedbacks the CQI's for the cell $104_i$ and the cell $104_j$, respectively. The fed backed CQI's for each cell can be receiver dependent, e.g., based on linear MMSE, MMSE/SIC, or MLD, etc. Based on the CQI fed back from the mobile device 108i, the base station 102 will transmit to the mobile device $108_i$ one stream through the antenna $106_i$ and another stream through the antenna $106_j$ with the appropriate MCS selection. Therefore, as it appears to the mobile device $108_i$, it seems an equivalent single-user MIMO scheme where the mobile device $108_i$ is served two spatial streams, one from the cell $106_i$ and one from the cell $106_j$. The mobile device $108_i$ can apply, by way of example, linear MMSE receiver to separate the two streams, or enhanced version, MMSE/SIC, etc. The advantage of this scheme is that other than scheduling, there is little coordination between the two cells (in terms of beam or rate selection). Therefore, it is a easy transition from legacy system.

A close-coordinated scheme may be implemented where the mobile device $108_i$ treats the channel matrices from the cell $104_i$ and the cell $104_j$ jointly. The fed backed CQI's are defined as per-layer CQI of the joint channel matrix of the virtual joint cell. Unlike the loose-coordinated scheme, where each data stream is only sent from one antenna 106, this scheme is more general. In the non-precoded scenario, this scheme can become the loose-coordinated scheme discussed above or add the antenna permutation to increase the spatial symmetry between the different streams. In the precoded scenario, each stream is pre-multiplied by a precoding vector spanning all the TX antennas across the cell 104i and the cell 104j. Then, the precoded streams are added across all antennas before transmission. This scheme can be generalized to 3 or more cells by those skilled in the art.

Figure 6:
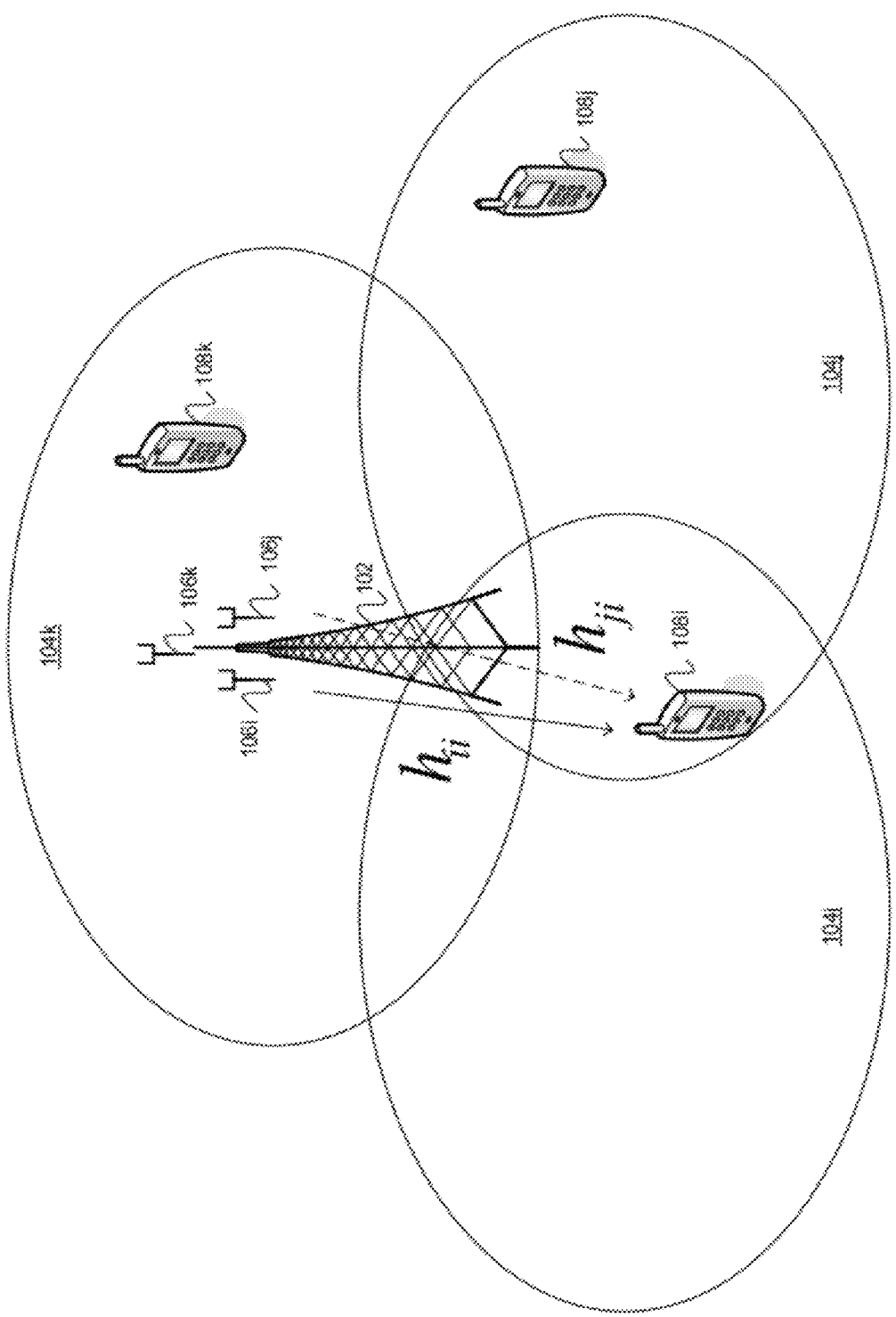
FIG. 6 illustrates aspects of a multiple access wireless communication system with a base station having two TX antennas and a mobile device at the cell edge.

Next, various concepts will now presented for a base station 102 having multiple TX antennas per cell. These concepts will be presented with reference to FIG. 6. FIG. 6 is a conceptual diagram of a multi-access wireless communication system similar to that shown in FIG. 4, except that the base station utilizes two TX antennas $106_{i1}$ and $106_{i2}$ to serve the cell $104_i$, two TX antennas $106_{j1}$ and $106_{j2}$ to serve the cell $104_j$, and two TX antennas $106_{k1}$ and $106_{k2}$ to serve the cell $104_k$. In this example, the mobile device $108_i$ is at the edge of the cell $104_i$. When there is no interference from the cell $104_j$, the base station 102 can utilize the link $h_{ji}$ to assist the transmission to mobile device $108_i$. To accomplish this, the base station 102 treats the channel matrices from the cell $104_i$ and the cell $104_j$ jointly. Typically, in this case, the total number of TX antennas will be larger than the number of RX antennas. Therefore, precoding matrices should be selected at the mobile device $108_i$ and fed back to the base station 102 to boost the beamforming power gain. On the other hand, if the effective dimension increases (minimum of TX and RX antenna number), more streams can be transmitted to the mobile device $104_i$ as well.

Figure 7:
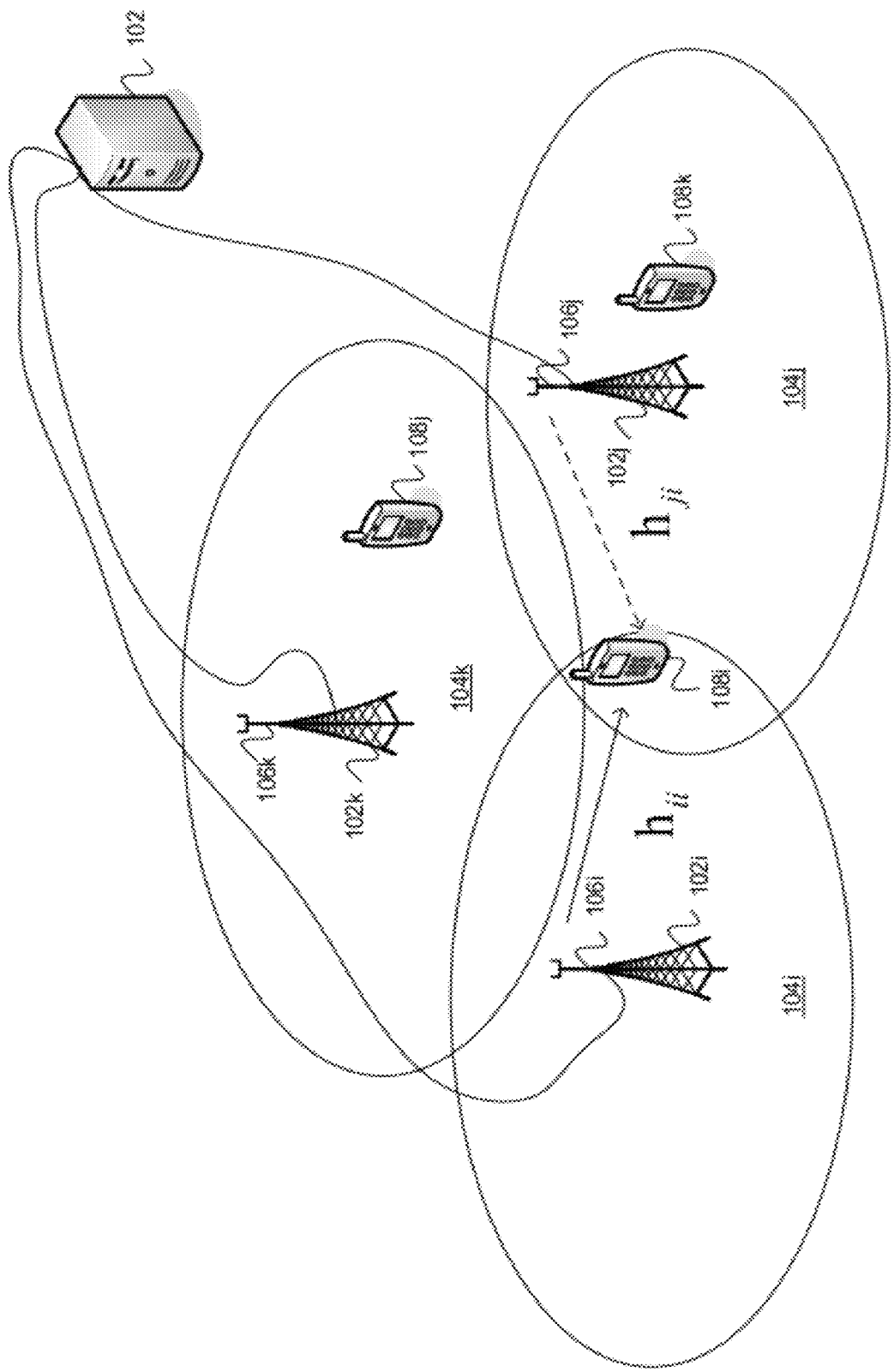
FIG. 7 illustrates aspects of a distributed antenna system in a multiple access wireless communication system with a mobile device at the cell edge.

A conceptual diagram of a distributed antenna system is shown in FIG. 7. In this example, the base station 102 is shown supporting two TX antennas $106_{i1}$ and $106_{i2}$ to serve the cell $104_i$, two TX antennas $106_{j1}$ and $106_{j2}$ to serve the cell $104_j$, and two TX antennas $106_{k1}$ and $106_{k2}$ to serve the cell $104_k$. The distributed antenna system shown in FIG. 7 is just a special case of the wireless communication systems presented earlier in this disclosure and the various concepts described through this disclosure can be extended to this system.

Figure 8:
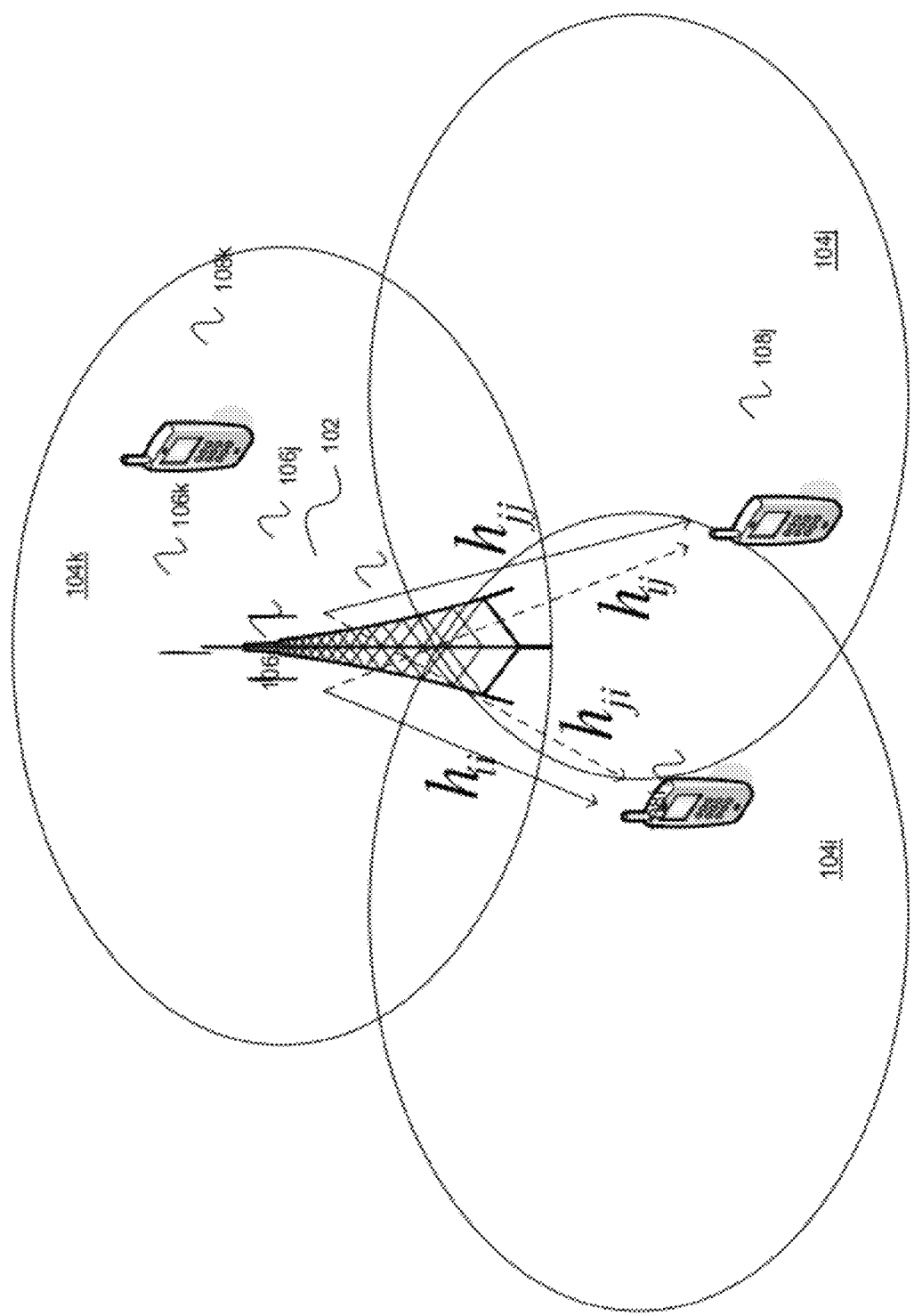
FIG. 8 illustrates aspects of a multiple access wireless communication system with two mobile devices at their respective cell edges.

Various concepts will now be presented for a base station 102 to utilize spatial dimensions to minimize interference caused to cell-edge mobile devices 108. These concepts will first be presented for a base station 102 having a single TX antenna per cell, and then for a base station 102 having multiple TX antennas per cell. FIG. 8 is a conceptual diagram of a multi-access wireless communication system having a base station 102 with a single TX antenna per cell. In this example, the mobile device $108_i$ is shown at the edge of the cell $104_i$ and the mobile device $108_j$ is shown at the edge of the cell $104_j$. Without inter-cell coordination within the base station 102, the transmission to each mobile device 108 user is a single-input single-output (SISO) or single-input multi-output (SIMO) transmission. In this case, the mobile device $108_i$ experiences interference from the cell $104_j$ proportional to $|h_{ij}|^2$ and the mobile device $108_j$ experiences interference from the cell $108_i$ proportional to $|h_{ij}|^2$.

In this example, the base station 102 treats the scalar channels from the base station antenna 106 for each cell as the components of a virtual vector channel. Therefore, for the mobile devices $108_i$ and $108_j$, $h_i=[h_{ii} h_{ji}]$ and $h_j=[h_{ij} h_{jj}]$, respectively. Conceptually, the base station 102 has converted the two cells $104_i$ and $104_j$, where each cell 104 has single TX transmit antennas, to a virtual cell with two TX antennas. In effect, the base station 102 has translated the transmission scheme to the two mobile devices $108_i$ and $108_j$ into a multi-user MIMO scheme where each of the mobile device's transmissions can be sent from both TX antennas $106_i$ and $106_j$. Note that for this scheme, the base station 102 transmits only one stream to each mobile device. In this scheme, the channel estimates $h_i$ and $h_j$ are fed back from the mobile devices $108_i$ and $108_j$ for FDD systems and estimated from uplink channel using channel reciprocity for TDD systems.

The channel estimates $h_i$ and $h_j$ are used by the TX processor 220 (see FIG. 2) in the base station 102 to precode the data streams to generate the spatial streams for transmission to mobile stations $108_i$ and $108_j$. The zero-forcing (ZF) precoder solution is defined as follows: given $H_{eq}=[h_i^T, \ldots, h_j^T, \ldots]^T$, the precoding matrix is given as:

$$W = \Lambda \cdot H_{eq}^H (H_{eq} H_{eq}^H)^{-1},$$

where $\Lambda$ is a diagonal matrix normalizing the transmit power. Note that if the channel is perfectly known at the base station 102, the mobile station $108_i$ will experience no interference from the cell $104_j$.

An MMSE precoder may be used to maximize the signal-to-caused interference ratio for the mobile device $104_i$:

$$SCIR_i = \frac{|h_i w_i|^2 P_i}{\sum_{j \neq i} |h_j w_i|^2 P_i + N_i},$$

the solution is equivalent to the MMSE receiver for the corresponding virtual uplink which is given by:

$$w_i^{MMSE} = \left(N_i I + P_i \sum_{j \neq i} h_j^H h_j\right)^{-1} h_i^H$$

In multi-access wireless communication systems where the mobile devices 108 have multiple RX antennas, the vectors $h_i$ and $h_j$ are the resulting equivalent vector channel assuming certain receive filtering is applied. One possible receive filter is the dominant left eigen vector of the channel matrix for the corresponding mobile device.

At the base station 102, the processor 230 schedules the transmissions to the mobile devices $108_i$ and $108_j$. In this example, the base station 102 provides a scheduler function to select the mobile devices $104_i$ and $104_j$ independently. At the beamforming/precoding stage, the selected mobile devices $104_i$ and $104_j$ may be paired for joint transmission.

Another implementation of the scheduling function is to run a joint scheduler across two cells. This scheme may maximize the performance gain and minimize the power loss from preceding. For the joint scheduling scheme, the base station 102 can first select the mobile device 108 with the highest metric (based on certain fairness, e.g., proportional fair) among both cells 104. If this mobile device 108 is selected from one cell 104 (e.g., cell $104_i$), then the next step is to select a compatible mobile device 108 from the other cell (e.g., cell $104_j$). One way to select the next mobile device 108 is as follows:

(1) Identify a subset of all the mobile devices 108 from the cell $104_j$ whose channel directional information (CDI) has small correlation relative to that of the selected mobile device from the cell $104_i$. The CDI, for example, is defined as $\tilde{h}_i = h_i / \|h_i\|$ for the mobile device 108$i$.

(2) From this subset of mobile devices 108 from the cell $104_j$, select the mobile device $108_j$ with the highest metric to pair with the mobile device $108_i$ from the cell $104_i$.

This scheduling scheme is configured to select one mobile device 108 from each cell 104. One variation is to take away this constraint and also allow the possibility of both mobile devices $108_i$ and $108_j$ being selected from the same cell 104 as long as both have high fairness metrics and have small correlations in terms of CDI.

With the latter scheduling scheme, there is no cell identification associated with one mobile device 108 anymore and all mobile devices 108 belong to the same joint virtual cell. As a consequence, sectorization may become redundant.

Figure 9:
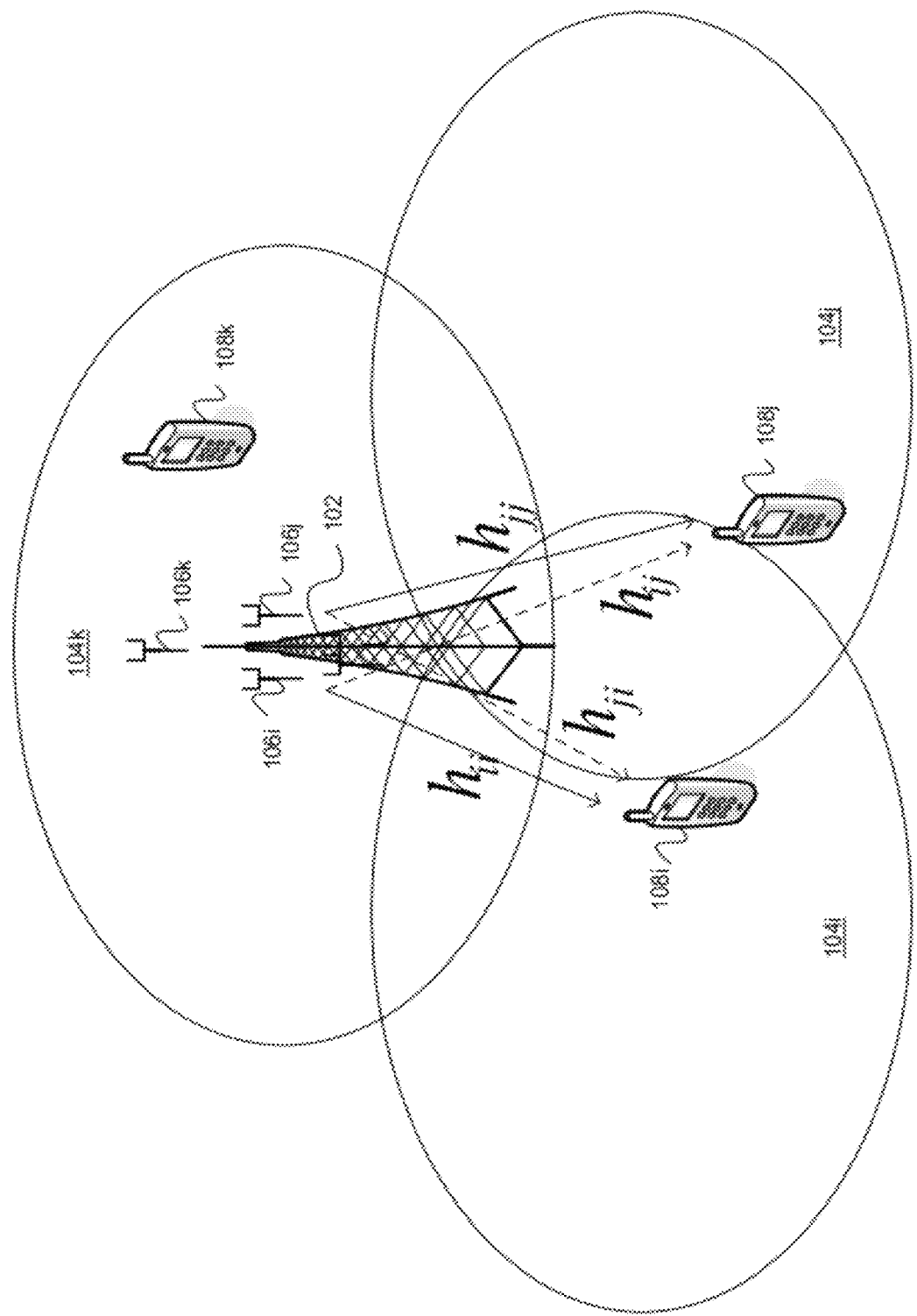
FIG. 9 illustrates aspects of a multiple access wireless communication system with a base having two TX antennas and two mobile devices at their respective cell edges.

Various concepts will now present for a base station 102 having multiple TX antennas per cell. These concepts will be presented with reference to FIG. 9. FIG. 9 is a conceptual diagram of a multi-access wireless communication system similar to that shown in FIG. 8, except that the base station utilizes two TX antennas $106_{i1}$ and $106_{i2}$ to serve the cell $104_i$, two TX antennas $106_{j1}$ and $106_{j2}$ to serve the cell $104_j$, and two TX antennas $106_{k1}$ and $106_{k2}$ to serve the cell $104_k$. In this example, the mobile device $108_i$ is at the edge of the cell $104_i$ and the mobile device $108_j$ is at the edge of the cell $104_j$. Without inter-cell coordination, the transmission to each mobile device 108 is a multi-input single-output (MISO) or multiple-input multi-output (SIMO) transmission. In this case, the beamforming or spatial multiplexing scheme from the base station 102 in a cell 104 generally attempts to maximize the performance of the mobile device 108 within its own cell 104. However, various techniques may be implemented at the base station 102 to deal with potential interference caused to the mobile devices 108 in other cells 104. These techniques are a generalized version of the approach described for single TX antenna per cell described earlier. The difference is that the channel from the base station's antenna 106 in one cell 104 to one mobile device 108 becomes a MISO channel for a mobile device 108 with a single RX antenna and a MIMO channel for a mobile device 108 with multiple RX antennas.

Various concepts will first be discussed in connection with mobile devices having a single RX antenna. In this configuration, the vector channels from the base station antennas 106 of each cell 104 are treated as the components of a virtual vector channel. Therefore, for the mobile devices $108_i$ and $108_j$, the channel estimate is $h_i = [h_{ii}\ h_{ji}]$ and $h_j = [h_{ij}\ h_{jj}]$, respectively. In effect, the transmission scheme to two mobile devices 104$i$ and 104$j$ have been translated into a multi-user MIMO scheme where the base station 102 can transmit to each of the mobile devices 104$i$ and 104$j$ the TX antenna arrays 106 for both cells 104. In case of single RX antenna per mobile device 108, the transmission schemes can be the same as the ones described earlier for the single TX antenna per cell scenario, e.g., ZF or MMSE precoder. In addition, the base station 102 can schedule more than one mobile device 108 per cell 104 as long as the total number of mobile devices 108 is less than or equal to the total number of TX antennas 106 across both cells 104. The transmit precoders discussed above (e.g., ZF or MMSE) still apply.

Next, various concepts will be discussed in connection with mobile devices having multiple RX antennas. In the case of multiple RX antennas per mobile device 108, again, vector $h_i$ and $h_j$ are the resulting equivalent vector channels assuming certain receive filtering is applied. One possible receive filter is the dominant left eigen vector of the channel matrix for the corresponding mobile device 108 where $h_i$ for the mobile device $108_i$ and $h_j$ for the mobile device $108_j$ are the scaled versions of the dominant right eigen vector. In addition, the base station 102 can schedule more than one stream per mobile device 108. For example, if the mobile device $108_i$ wants to request M streams, it can report M equivalent channel vectors to the base station 102 where the m-th channel vector is the m-th dominant right eigen vector. Then, at the base station 102, the precoder assumes each equivalent channel vector as a virtual mobile device 108 and then applies the same preceding schemes discussed above. Antenna permutation can be applied among the streams being served to one mobile device 108 to achieve the symmetry/balance/robustness among the streams. In addition, the base station 102 can schedule more than one mobile device 108 per cell as long as the total number of mobile devices 108 served is less than or equal to the total number of TX antennas 106 across both cells 104. The transmit precoders discussed above (e.g., ZF or MMSE) still apply.

As discussed earlier, the processor 230 (not shown) in the base station 102 may be configured to select the mobile devices 108 and perform scheduling functions. If only one stream per mobile device 108 is assumed and the number of mobile devices 108 scheduled equals the number of cells 104, the joint scheduling/user selection algorithms essentially are the same as the ones described earlier for mobile devices with a single TX transmit antenna where the base station 102 can either (1) always select one mobile device 108 per cell 104 by running the scheduler on per-cell basis sequentially, or (2) treat all the cells 104 as a joint cell by running a single scheduler across all mobile devices 108 in different cells 104.

If the base station 102 has the flexibility to serve more mobile devices 108 than the number of cells 104 and/or more than one stream per mobile device 108, the scheduling algorithm discussed above can be extended by treating each reported equivalent channel vector as a virtual mobile device and then applying the scheduling algorithm over the virtual user domain. Additional constraints can be put into the scheduling algorithm to allow (1) at least one mobile device 104 to be selected from each cell 104 and/or, (2) allow at most T streams to be served per mobile device 108 (e.g., T=2). Again, the total number of streams transmitted across mobile devices 108 should be less than or equal to the total number of TX transmit antennas across both cells 104. Generally speaking, if the mobile devices 108 are well separated geographically, it may be better to select more one-stream mobile devices 108 than select less mobile devices 108 with more than one stream each since more multi-user diversity gain can be achieved while minimizing the precoding power loss.

From precoding perspective, the concepts presented in connection with FIG. 9 treat all the antennas 106 from both cells 104 as a single antenna array. Therefore, the transmission schemes essentially become single-virtual-cell multiuser MIMO system. Alternatively, a low-level coordination scheme may be used to keep the beamforming distributed at each cell 104 locally. This scheme will have the benefits of keeping the legacy system architecture with minimal changes. On the other hand, the concepts presented in connection with FIG. 9 forms an antenna array with more TX antennas 106 to provide more effective beamforming and more degrees of freedom for spatial nulling.

Various concepts for a low-level coordination scheme will be presented for mobile devices 108 with single RX antennas. In this example, for the mobile device 108$_i$, h$_{ii}$ and h$_{ji}$ are kept separated instead of forming a joint channel. The signal for the mobile device 108$_i$, is transmitted from the cell 104$_i$, i.e., experiencing only the vector channel h$_{ii}$. On the other hand, the mobile device 108$_i$, still will experience interference coming from the cell 104$_j$ over h$_{ji}$ due to co-channel interference. However, since both cells 104$_i$, and 104$_j$, belong to the same base station 102, the base station 102 can take into the consideration of the interference caused to the mobile device 108$_i$ when selecting the mobile device 108$_j$ to serve and the beamforming vector. Similarly, the base station 102 can take into the consideration of the interference caused to the mobile device 108$_j$ when selecting the mobile device 108$_i$ to serve and the beamforming vector.

One scheme is to select the beamforming/precoding vector to maximize the signal-to-caused interference ratio which is defined as:

$$w_i^{opt} = \underset{w}{\mathrm{argmax}} \frac{|h_{ii} w|^2 P}{\sum_{j \neq i} |h_{ij} w|^2 P + (w^H w) N_i},$$

The solution is equivalent to the MMSE receive filter of the corresponding virtual uplink, $$r_i = w^H \left( h_{ii}^H \sqrt{P} s_i + \sum_{j \neq i} h_{ij}^H \sqrt{P} s_j + n_i \right)$$

$$w_i^{MMSE} = \left( N_i I + P \sum_{j \neq i} h_{ij}^H h_{ij} \right)^{-1} h_{ii}^H.$$

If the noise power is small and can be ignored, the ZF precoder solution is defined as follows, given H$_{i,eq}$= [h$_{ii}^T$, ..., h$_{ij}^T$, ...]$^T$, the precoding vector for the mobile device 104$_i$ is given as $$w_i = (\Lambda \cdot H_{i,eq}^H (H_{i,eq} H_{i,eq}^H)^{-1})_{1st\ column},$$

where $\Lambda$ is a diagonal matrix normalizing the transmit power.

Next, various concepts for a low-level coordination scheme will now be presented for mobile devices 108 with multiple RX antennas. In this example, where the are multiple RX antennas per mobile device 108, again, vector h$_{ii}$ is the resulting equivalent vector channel assuming certain receive filtering is applied. One possible receive filter is the dominant left eigen vector of the channel matrix for the corresponding user where h$_{ii}$ essentially is the scaled version of the dominant right eigen vector.

Note that the channel matrix considered here is the channel matrix to the mobile device 108 from its serving cell 104, H$_{ii}$. Essentially, h$_{ii}$=u$_{i,1}$H$_{ii}$=$\lambda_{i,1} \cdot$v$_{i,1}^H$. Similarly, the equivalent channel from the non-serving cell 104 is resulted by applying the same receive filter by h$_{ji}$=u$_{i,1}$H$_{ji}$.

In addition, the base station 102 can transmit more than one steam per mobile device 108 in a cell 104. For m-th stream, the equivalent channel vector h$_{ii,m}$=u$_{i,m}$H$_{ii}$=$\lambda_{i,m} \cdot$v$_{i,m}^H$ should be fedback as well as h$_{ji,m}$=u$_{i,m}$H$_{ji}$. Similar ZF and MMSE precoders can be defined. For example, for ZF precoder, at the cell 104, if we define $$H_{i,eq} = [h_{ii,1}^T, \ldots h_{ii,m}^T, \ldots, h_{ij,1}^T, \ldots, h_{ij,n}^T]^T,$$

then the preceding vector for m-th stream of the mobile device 108$_i$ is given as:

$$w_{i,m} = (\Lambda \cdot H_{i,eq}^H (H_{i,eq} H_{i,eq}^H)^{-1})_{m\text{-}th\ column}.$$

The number of streams served per mobile device 108, S, can equal the number of RX antennas. Nevertheless, S usually should be chosen so that at least one receive dimension (degree of freedom) can be available for interference suppression for residual inter-user interference. In addition, the base station 102 can schedule more than one mobile device 108 per cell as long as the total number of mobile devices 108 is less than or equal to the total number of TX antennas across both cells. The transmit precoders discussed above (e.g., ZF or MMSE) still apply.

From scheduling perspective, the base station 102 runs the scheduler for each cell 104 to select the mobile device 108 independently. After the decision is made for each cell 104, it is propagated to the scheduler for the neighbor cells 104. Then, each scheduler examines the mobile devices (or streams) to be served by the neighbor cells 104, and if those mobile devices 108 (or streams) report the channel vectors from the current cell 104, then the base station 102 carries out the beamforming schemes discussed above to minimize interference caused to those mobile devices 108 (or streams).

Similarly, the scheduler may be improved by considering all the mobile devices 108 across the cells 104 jointly. The base station 102 can first select the mobile device 108 (or stream) with the highest metric (based on certain fairness, e.g., proportional fair) among the cells 104. One way to select the next mobile device 108 is as follows:

(1) For all the remaining mobile devices 108 (streams), identify a subset of the mobile devices 108 whose CDI has small correlation relative to that of the selected mobile device 108 (stream);

(2) From this subset of mobile devices 108 (or streams), select the mobile device 108 (or stream) with the highest metric to pair with the mobile devices 108 (or stream);

(3) Continue the process until all the mobile devices 108 (or streams) are selected.

This user selection procedure can help to minimize the power loss from preceding. Certain restrictions can be applied to limit only one mobile device 108 per cell, and/or at most T streams per mobile device 108 user (e.g, T=2) and/or, to allow possible shut off one or more cells 104 in case there are new compatible mobile devices 108, which are essentially adaptive FFR.

In the preceding approach, only low-level coordination is done at the mobile device 108 selection level. The base station 102 still decides the beamforming/precoding vector for each cell 104 separately. One more level of cooperation is to, based on the same feedback channels, jointly select the precoding vectors across the cells 104 within one mobile device 108. This approach may be implemented with finite-size preceding codebook with different criteria. By way of example, maximize the sum rate or the harmonic mean of mobile device rates, e.g., $$R = \sum_i \log(1 + SINR_i)$$

$$SINR_i = \frac{P_i|h_{ii}w_i|^2}{N_i + \sum_{j \neq i} P_j|h_{ji}w_j|^2} = \frac{P_i\|h_{ii}\|^2|\tilde{h}_{ii}w_i|^2}{N_i + \sum_{j \neq i} P_j\|h_{ji}\|^2|\tilde{h}_{ji}w_j|^2}$$

This approach requires addition feedbacks on the interference power of each user.

Alternatively, a hybrid approach may be used. By way of example, with two mobile devices 108, the high-geometry mobile device 108 selects the precoding vector first based on close-form ZF solution and the low-geometry mobile device 108 selects the precoding vector from finite codebook.

In the above discussions, the receive filters (e.g., left eigen vectors) are applied to obtain the equivalent channel vectors for feedback purposes. In addition, if the base station 102 has perfect channel state information, the data at the mobile device's side will experience no inter-user interference after applying the described receive filters. However, due to quantization errors, channel variations and/or channel estimation errors, by the time the mobile device 108 receives the signals, the channel observed by the mobile device 108 could be different from the one assumed by the base station 102. One approach to deal with this issue is to keep using the dominant left eigen vector. The mobile station 108 can apply the MMSE filter to null out the residual interference due to channel mismatches. In particular, if only one stream is served per mobile device 108, the RX antenna array can use the remaining N−1 antennas for interference suppression purpose.

Figure 10:
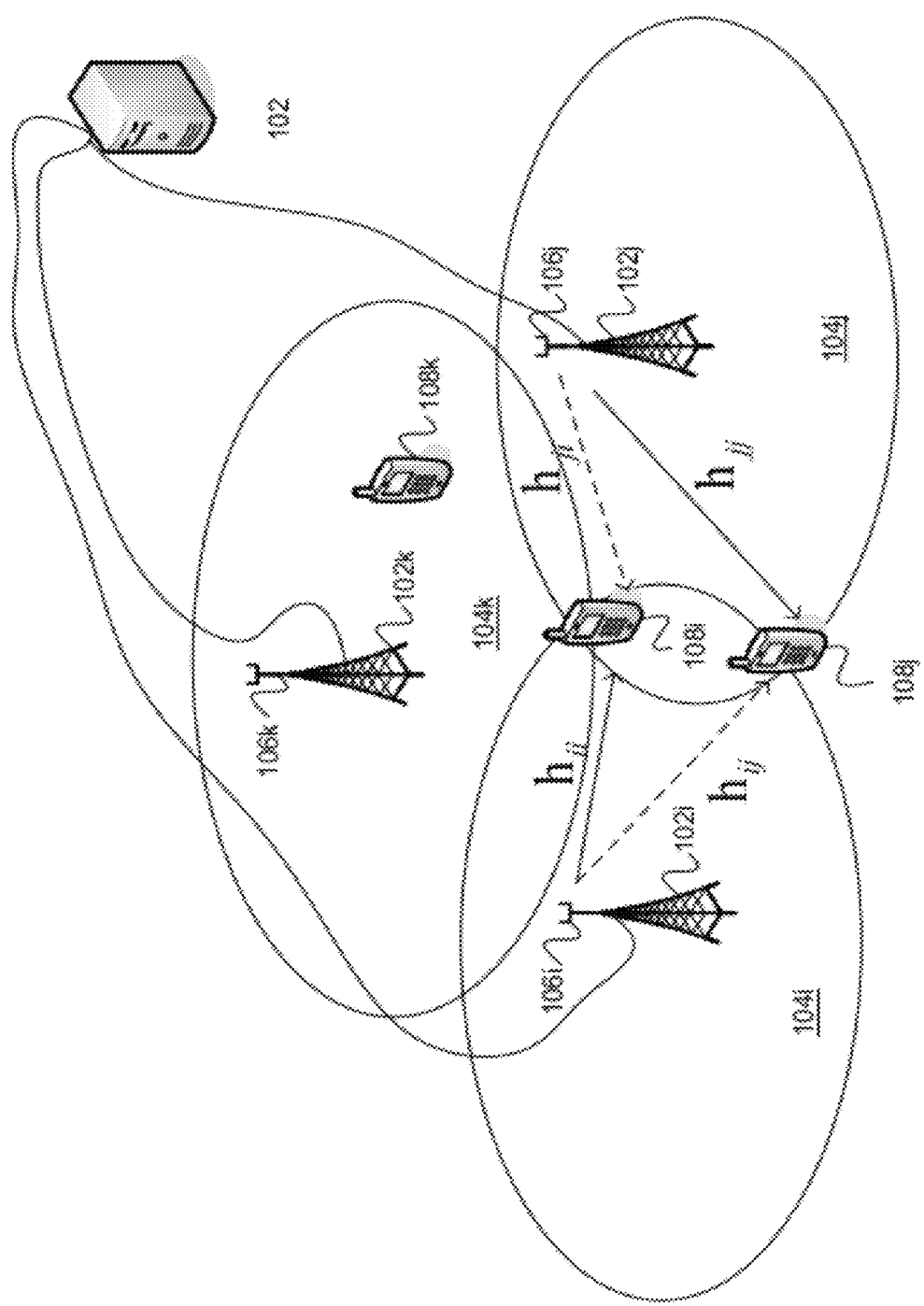
FIG. 10 illustrates aspects of a distributed antenna system in a multiple access wireless communication system antenna systems employing two TX antennas and two mobile devices at their respective cell edges.

A conceptual diagram of a distributed antenna system is shown in FIG. 10. In this example, the base station 102 is shown supporting two TX antennas $106_{i1}$ and $106_{i2}$ to serve the cell $104_i$, two TX antennas $106_{j1}$ and $106_{j2}$ to serve the cell $104_j$, and two TX antennas $106_{k1}$ and $106_{k2}$ to serve the cell $104_k$. The distributed antenna system shown in FIG. 10 is just a special case of the wireless communication systems presented earlier in this disclosure and the various concepts described through this disclosure can be extended to this system.

The various concepts presented throughout this disclosure can be generalized to three or more cells by those skilled in the art.

In sum, the processing system 213 is the means by which coverage for a first cell is provided through a first antenna system and coverage for a second cell is provided through a second antenna system. An antenna system may comprise a single directional antenna, multiple antenna elements, or a MIMO, MISO, SISO arrangement.

The processing system 213 is also the means by which data is processed for transmission to a mobile device in the first cell using the first and second antenna systems. The processing system 213 uses a first channel estimate between the first antenna system and the mobile device, and a second channel estimate between the second antenna system and the mobile device to process the data for transmission.

The processing system 213 is the means by which the first and second channel estimates are received from the mobile device. The processing system 213 provides the means for enabling the mobile device to compute the estimates from reference signals transmitted from both the first and second antenna systems. This is accomplished by (1) generating non-colliding first and second reference signals for transmission into the first and second cells, respectively, and puncturing data for transmission into the first cell to enable the mobile device to generate the second channel estimate from the second reference signal, or (2) generating colliding first and second reference signals for transmission into the first and second cells, respectively, and puncturing the first reference signal to enable the mobile device to generate the second channel estimate from the second reference signal.

The processing system may coordinate transmissions to mobile device in the first cell and utilize spatial dimensions to (1) enhance the performance of mobile device by either sending more spatial beams or providing more beamforming power gain, and/or (2) minimize interference experienced by the mobile devices. In the case of the latter, the processing system provide the means for selecting a second mobile device in the second cell for joint transmission with the mobile device in the first cell, wherein the selection of the second mobile device is based on reducing the interference.

Figure 11:
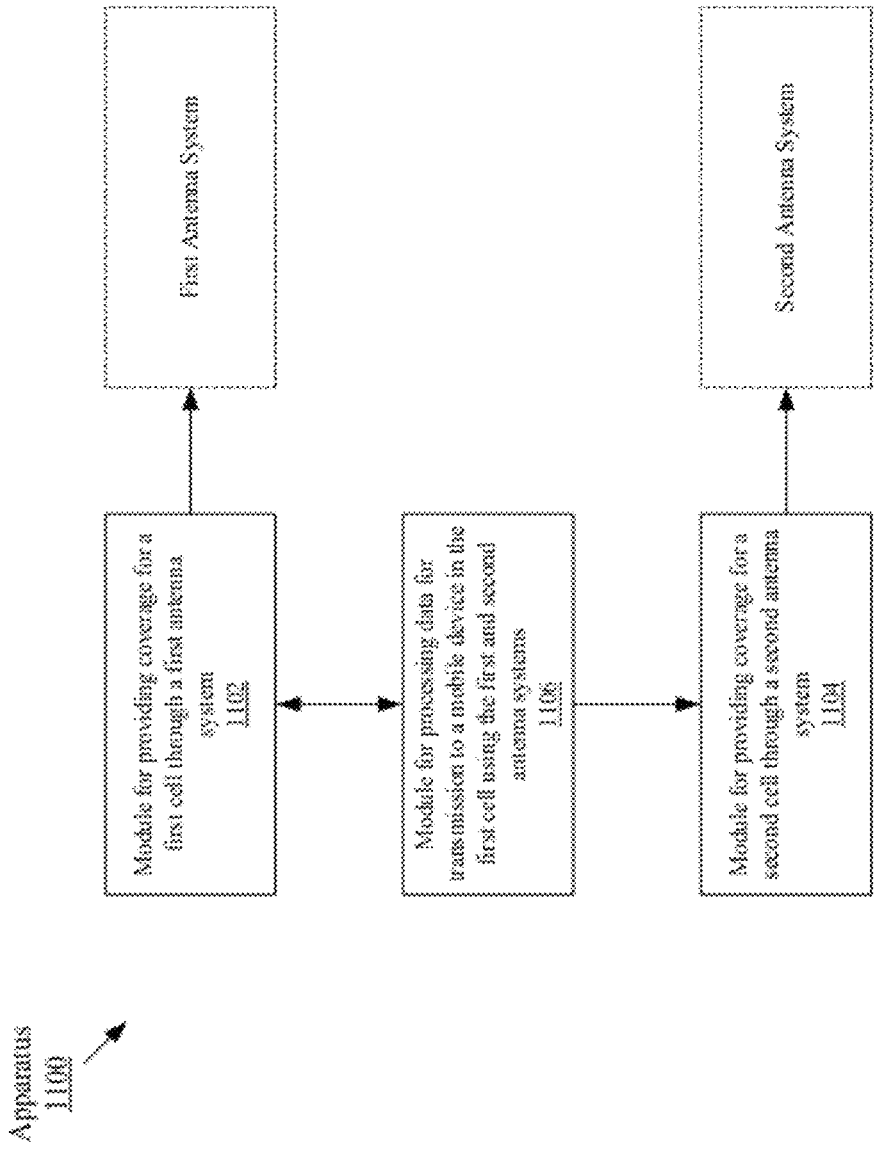
FIG. 11 illustrates aspects relating to the functionality of a base station.

FIG. 11 is a block diagram illustrating an example of the functionality of an apparatus. The apparatus 1100 includes a module 1102 for providing coverage for a first cell through a first antenna system, a module 1104 for providing coverage for a second cell through a second antenna system, and a module 1106 for processing data for transmission to a mobile device in the first cell using the first and second antenna systems.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media.

For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, a computer program product having computer executable code, a wireless channels and various other media capable of storing, containing, and/or carrying instruction(s) and/or data. Additionally, a computer program product can include a computer readable medium having one or more instructions or codes operable to cause a computer to perform the functions described herein.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects can be described or claimed in the singular, the plural is contemplated unless limitation to the singular is explicitly stated. Additionally, all or a portion of any aspect and/or aspect can be utilized with all or a portion of any other aspect and/or aspect, unless stated otherwise. To the extent that the term "includes" is used in either the detailed description or the claims, such term is intended to be inclusive in a manner similar to the term "comprising" as "comprising" is interpreted when employed as a transitional word in a claim.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. An apparatus for wireless communications, comprising:
   means for providing coverage for a first cell through a first antenna system;

means for providing coverage for a second cell through a second antenna system;
means for processing data for transmission to a mobile device in the first cell using the first and second antenna systems;
means for generating first and second reference signals for transmission into the first and second cells, respectively; and
one of:
    means for puncturing the data for transmission into the first cell when the first and second reference signals are non-colliding; and
    means for puncturing the first reference signal when the first and second reference signals are colliding,
wherein the apparatus performs the puncturing over different sub-frames.

2. The apparatus of claim 1 wherein the means for processing data uses a first channel estimate between the first antenna system and the mobile device, and a second channel estimate between the second antenna system and the mobile device to process the data for transmission.

3. The apparatus of claim 2 further comprising means for receiving the first and second channel estimates from the mobile device.

4. The apparatus of claim 2, wherein the
means for generating comprises means for generating non-colliding first and second reference signals for transmission into the first and second cells, respectively.

5. The apparatus of claim 2, wherein the
means for generating comprises means for generating colliding first and second reference signals for transmission into the first and second cells, respectively.

6. The apparatus of claim 1 wherein the means for processing data processes the data for transmitting a plurality of spatial streams to the mobile device through the first and second antenna systems.

7. The apparatus of claim 1 wherein the means for processing data processes the data to form a beam pattern for transmitting the data to the mobile device through the first and second antenna systems.

8. The apparatus of claim 1 wherein the means for processing data utilizes spatial dimensions to reduce interference.

9. The apparatus of claim 8 further comprising means for selecting a second mobile device in the second cell for joint transmission with the mobile device in the first cell, wherein the selection of the second mobile device is based on reducing the interference.

10. The apparatus of claim 1 wherein the means for processing data precodes the data based on channel conditions between the mobile device and the first and second antenna systems.

11. A method for wireless communications, comprising:
providing coverage for a first cell through a first antenna system;
providing coverage for a second cell through a second antenna system;
processing data for transmission to a mobile device in the first cell using the first and second antenna systems;
generating first and second reference signals for transmission into the first and second cells, respectively; and
one of:
    puncturing the data for transmission into the first cell when the first and second reference signals are non-colliding; and
    puncturing the first reference signal when the first and second reference signals are colliding,
wherein the puncturing is performed over different sub-frames.

12. The method of claim 11 wherein the processing of data comprises using a first channel estimate between the first antenna system and the mobile device, and a second channel estimate between the second antenna system and the mobile device to process the data for transmission.

13. The method of claim 12 further comprising receiving the first and second channel estimates from the mobile device.

14. The method of claim 12, wherein the
generating comprises generating non-colliding first and second reference signals for transmission into the first and second cells, respectively.

15. The method of claim 12, wherein the
generating comprises generating colliding first and second reference signals for transmission into the first and second cells, respectively.

16. The method of claim 11 wherein the processing of data comprises processing the data for transmitting a plurality of spatial streams to the mobile device through the first and second antenna systems.

17. The method of claim 11 wherein the processing of data comprises processing the data to form a beam pattern for transmitting the data to the mobile device through the first and second antenna systems.

18. The method of claim 11 wherein the processing of data comprises utilizing spatial dimensions to reduce interference.

19. The method of claim 18 further comprising selecting a second mobile device in the second cell for joint transmission with the mobile device in the first cell, wherein the selection of the second mobile device is based on reducing the interference.

20. The method of claim 11 wherein the processing of data comprises precoding the data based on channel conditions between the mobile device and the first and second antenna systems.

21. An apparatus for wireless communications, comprising:
a processing system configured to:
    provide coverage for a first cell through a first antenna system;
    provide coverage for a second cell through a second antenna system;
    process data for transmission to a mobile device in the first cell using the first and second antenna systems;
    generate first and second reference signals for transmission into the first and second cells, respectively; and
    one of:
        puncture the data for transmission into the first cell when the first and second reference signals are non-colliding; and
        puncture the first reference signal when the first and second reference signals are colliding,
    wherein the puncturing is performed over different sub-frames.

22. The apparatus of claim 21 wherein the processing system is further configured to process data using a first channel estimate between the first antenna system and the mobile device, and a second channel estimate between the second antenna system and the mobile device to process the data for transmission.

23. The apparatus of claim 22 the processing system is further configured to receive the first and second channel estimates from the mobile device.

24. The apparatus of claim 22 wherein the processing system is further configured to:
generate non-colliding first and second reference signals for transmission into the first and second cells, respectively.

25. The apparatus of claim 22 wherein the processing system is
further configured to:
generate colliding first and second reference signals for transmission into the first and second cells, respectively.

26. The apparatus of claim 21 wherein the processing system is further configured to process data for transmitting a plurality of spatial streams to the mobile device through the first and second antenna systems.

27. The apparatus of claim 21 wherein the processing system is further configured to process data to form a beam pattern for transmitting the data to the mobile device through the first and second antenna systems.

28. The apparatus of claim 21 wherein the processing system is further configured to process data utilizing spatial dimensions to reduce interference.

29. The apparatus of claim 28 wherein the processing system is further configured to select a second mobile device in the second cell for joint transmission with the mobile device in the first cell, wherein the selection of the second mobile device is based on reducing the interference.

30. The apparatus of claim 21 wherein the processing system is further configured to process data by precoding the data based on channel conditions between the mobile device and the first and second antenna systems.

31. A computer program product, comprising:
a non-transitory computer-readable medium, comprising:
code for generating a signal providing coverage for a first cell through a first antenna system;
code for generating a signal providing coverage for a second cell through a second antenna system;
code for processing data for transmission to a mobile device in the first cell using the first and second antenna systems;
code for generating first and second reference signals for transmission into the first and second cells, respectively; and
one of:
code for puncturing the data for transmission into the first cell when the first and second reference signals are non-colliding; and
code for puncturing the first reference signal when the first and second reference signals are colliding,
wherein the code for puncturing is executed over different sub-frames.

32. The computer program product of claim 31 wherein the code for processing data uses a first channel estimate between the first antenna system and the mobile device, and a second channel estimate between the second antenna system and the mobile device to process the data for transmission.

33. The computer program product of claim 32 wherein the instructions further comprise code for receiving the first and second channel estimates from the mobile device.

34. The computer program product of claim 32 wherein the instructions further comprise:
code for generating non-colliding first and second reference signals for transmission into the first and second cells, respectively.

35. The computer program product of claim 32 wherein the instructions further comprise:
code for generating colliding first and second reference signals for transmission into the first and second cells, respectively.

36. The computer program product of claim 31 wherein the code for processing data processing the data for transmitting a plurality of spatial streams to the mobile device through the first and second antenna systems.

37. The computer program product of claim 31 wherein the code for processing data processes the data to form a beam pattern for transmitting the data to the mobile device through the first and second antenna systems.

38. The computer program product of claim 31 wherein the code for processing data utilizes spatial dimensions to reduce interference.

39. The computer program product of claim 38 wherein the instructions further comprise code for selecting a second mobile device in the second cell for joint transmission with the mobile device in the first cell, wherein the selection of the second mobile device is based on reducing the interference.

40. The computer program product of claim 31 wherein the code for processing data precodes the data based on channel conditions between the mobile device and the first and second antenna systems.

\* \* \* \* \*